United States Patent [19]
Caldwell

[11] Patent Number: 5,493,204
[45] Date of Patent: Feb. 20, 1996

[54] NEGATIVE IMPEDANCE PEAK POWER TRACKER

[75] Inventor: David J. Caldwell, Hermosa Beach, Calif.

[73] Assignee: The Aerospace Corporation, El Segundo, Calif.

[21] Appl. No.: 285,840

[22] Filed: Aug. 4, 1994

Related U.S. Application Data

[63] Continuation of Ser. No. 14,931, Feb. 8, 1993, abandoned.

[51] Int. Cl.$^6$ ........................................................ G05F 5/00
[52] U.S. Cl. ............................................. 323/299; 323/906
[58] Field of Search .................................. 323/906, 299, 323/285, 303; 363/74, 78

[56] References Cited

U.S. PATENT DOCUMENTS

| | | | |
|---|---|---|---|
| 3,566,143 | 2/1971 | Paine | 307/126 |
| 4,375,662 | 3/1983 | Baker | 363/95 |
| 4,404,472 | 9/1983 | Steigerwald | 307/46 |
| 4,494,180 | 1/1985 | Streater | 363/37 |
| 4,580,090 | 4/1986 | Bailey | 323/303 |
| 4,604,567 | 8/1986 | Chetty | 323/299 |
| 4,794,272 | 12/1988 | Bavaro | 307/66 |
| 4,837,495 | 6/1989 | Zansky | 323/222 |
| 4,916,382 | 4/1990 | Kent | 323/299 |
| 5,027,051 | 6/1991 | Lafferty | 323/222 |
| 5,235,266 | 8/1993 | Schaffrin | 323/906 |

OTHER PUBLICATIONS

Comparison of Candidate Solar Array Maximum Power Utilization Approches, E. N. Costogue, S. Lindena 11th IECEC 1976 pp. 1449–1456.

Slope Detection As A Method Of Determining The Peak Power Point Of Solar Array, J. Paulkovich NASA Report No. X–636–64–282, Oct. 1964.

*Primary Examiner*—Peter S. Wong
*Assistant Examiner*—Adolf Berhane
*Attorney, Agent, or Firm*—William J. Burke; Derrick M. Reid

[57] ABSTRACT

A peak power tracker apparatus is used for controlling the negative impedance of converter for transferring maximum power from a solar array source to a battery and load typically used in space vehicles, by capacitive differentiation sensing the solar array source voltage for sensing the peak power point at which the source voltage first begins to become unstable and collapses, and then providing a step down control signal which controls a current mode pulse width modulator to control the converter to vary the negative impedance into the solar array then reserving back to a stable point at which the tracker then provide a linear ramp signal to the modulator to control the converter to drive the source voltage again to the peak power point, so as to alternate the feedback loop and source voltage between a stable point and the peak power point so as to transfer maximum power while preventing the source voltage to pass through an unstable point for discontinuous but stable operation at peak power transfer which is independent of array performance and is adaptable to a wide range of power sources.

11 Claims, 4 Drawing Sheets

NEGATIVE IMPEDANCE PEAK POWER TRACKER

STATEMENT OF GOVERNMENT INTEREST

The invention described herein may be manufactured and used by or for the Government of the United States for governmental purposes without the payment of royalty therefor. This is a continuation of application Ser. No. 08/014,931 filed on Feb. 8, 1993 now abandoned.

BACKGROUND OF THE INVENTION

1. Field of the Invention

The invention relates in general to techniques for power switching regulators and in particular to regulators for space-based and ground-based power systems.

2. Description of the Prior Art

FIG. 1 illustrates a typical space power system, in which the labels $R_S$ and $R_L$ refer to the resistances of the source and reflected load comprised of electrical demands from circuit elements of a spacecraft, respectively. Energy from a solar array is regulated by a power conditioning unit and supplied to the load, while a battery supplies storage energy to meet demands during peak load periods or during periods of eclipse when the solar array is not supplying energy. Two common types of power conditioning units are shunt systems or peak power tracking (PPT) systems. In a shunt system, the array is tied directly to the load through a diode, and excess array power is dissipated by the shunt when the battery is fully charged. In a PPT system, the PPT continuously senses the operating point of the solar array and generates a control signal to maximize power from the array. The control signal is used to adjust the reflected load impedance ($R_L$) through a switching converter to match the internal impedance of the array ($R_S$).

The primary advantage of the PPT over the shunt system is that the power generated by the array may be maximized through control of the converter. This allows the array size to be reduced or the load increased for a particular mission. FIG. 2, which is a typical solar array characteristic curve, illustrates this advantage. To draw maximum power, it is necessary to match the load impedance to the internal impedance of the array. The PPT generates a control signal that selects the operating point. This signal is updated continuously since the characteristics of the array change due to variations in temperature, illumination intensity, radiation degradation, aging and partial failure. In contrast with a PPT, a shunt system must be biased far off the maximum power point to allow for these variations.

These aspects of a PPT are disclosed in the prior art. In U.S. Pat. No. 4,794,272, the phase of the output current is monitored as the operating point of the source is dithered. The phase of output current response with respect to the dither indicates which side of peak power point source is operating. However, the system becomes unstable when negative impedance loads are present. An example of a negative impedance load is a power converter input port since current decreases in response to a voltage rise, due to its constant power output.

E. N. Costogue and Dr. S. Lindera disclose a dynamic impedance comparison technique in "Comparison of Candidate Solar Array Maximum Power Utilization Approaches", 11th IECEC (1976). The operating point of the source is dithered while the resultant voltage and current are measured. Measured waveforms are multiplied and differentiated in order to determine the relationship of source impedance to load impedance. Negative feedback is used to drive the system to the operating point where the source and load impedances are equal, this point equating to maximum power. A significant shortcoming of this system is that it becomes unstable with negative impedance loads.

Another technique is a slope detection technique of Paulovich. "Slope Detection As A Method Of Determining The Peak Power Point Of Solar Arrays" NASA Report No. X-636-64-282 (Oct. 1964). A constant current dither is inputed into the source and the voltage response is measured in order to determine the slope of IV curve of the source. Negative feedback is used to drive the system to a predetermined source slope, which is expected to be near the maximum power point. However, changes in characteristics of the source complicate tracking and result in less than maximum power. Another shortcoming of this technique is that the system is potentially unstable with negative impedance loads.

Costogue also discloses a variation of dynamic impedance comparison technique which senses the onset of voltage collapse. Unlike the above references, this technique can be used to maintain stability while driving negative impedance loads. The relationship of source impedance to load impedance is first determined through mathematical manipulation of voltage and current in response to dithering of the source. Negative feedback is used to drive system to an operating point short of the maximum power point, thereby preventing source voltage collapse. The primary shortcoming of this technique is that only a fraction of maximum power is tracked.

A primary object of the invention is therefore a technique that supplies maximum power while maintaining stable operation with negative impedance loads, such as power supply inputs and arcjet engines. Another object of the invention is a simple PPT with a low parts count that results in low levels of overhead power, high reliability, and low production costs.

SUMMARY OF THE INVENTION

The present invention provides a simple, low overhead peak power tracker (PPT) that varies the operating point of an energy source in one direction until a divergence in the array voltage is detected, whereupon the PPT reverses direction until the system is again stable. Repeating this procedure allows the array maximum power point to be tracked. This technique takes advantage of the inherent instability in the power system that occurs when the magnitude of the impedance of the source exceeds the negative impedance of the load.

DETAILED DESCRIPTION OF THE PREFERRED EMBODIMENT

The present invention takes advantage of inherent large signal instability that occurs when source impedance magnitude equals that of negative impedance load. This instability occurs in the voltage of a solar array as it reaches the peak power point.

Figure 1:
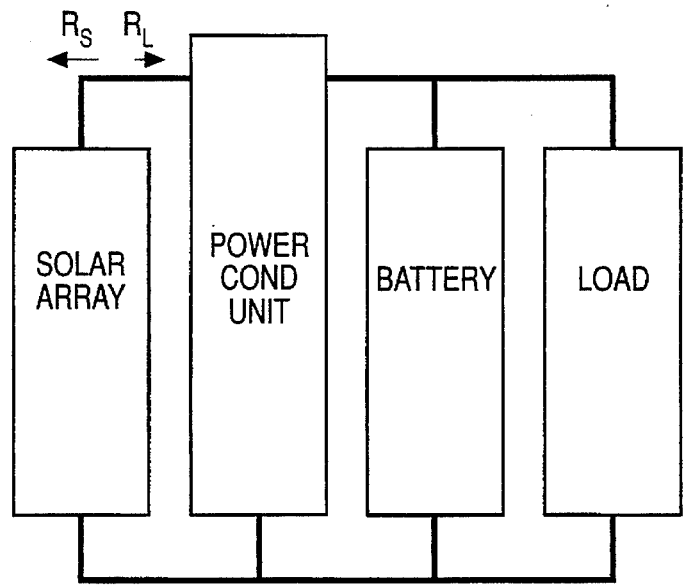
FIG. 1 is a schematic of a typical power system showing an energy source, a power conditioning unit, a battery and a load.
Figure 2:
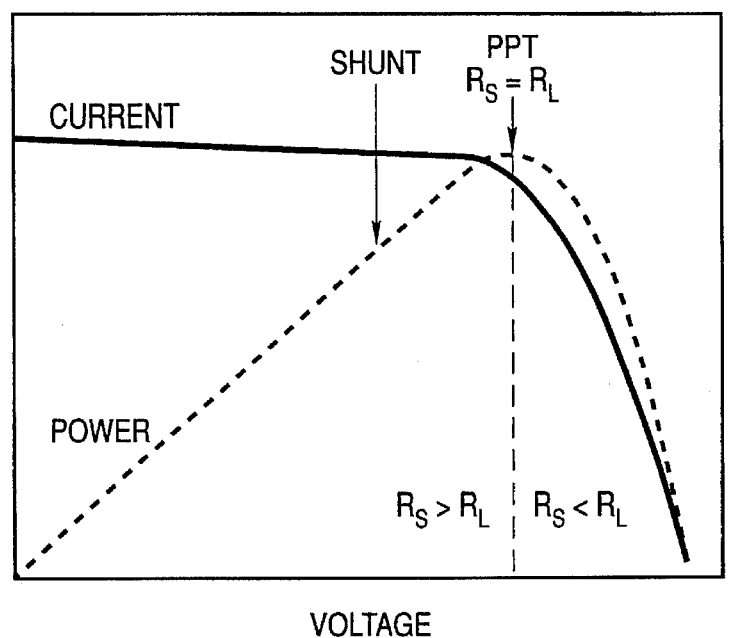
FIG. 2 is a graph illustrating the electrical characteristics of a solar array.
Figure 3:
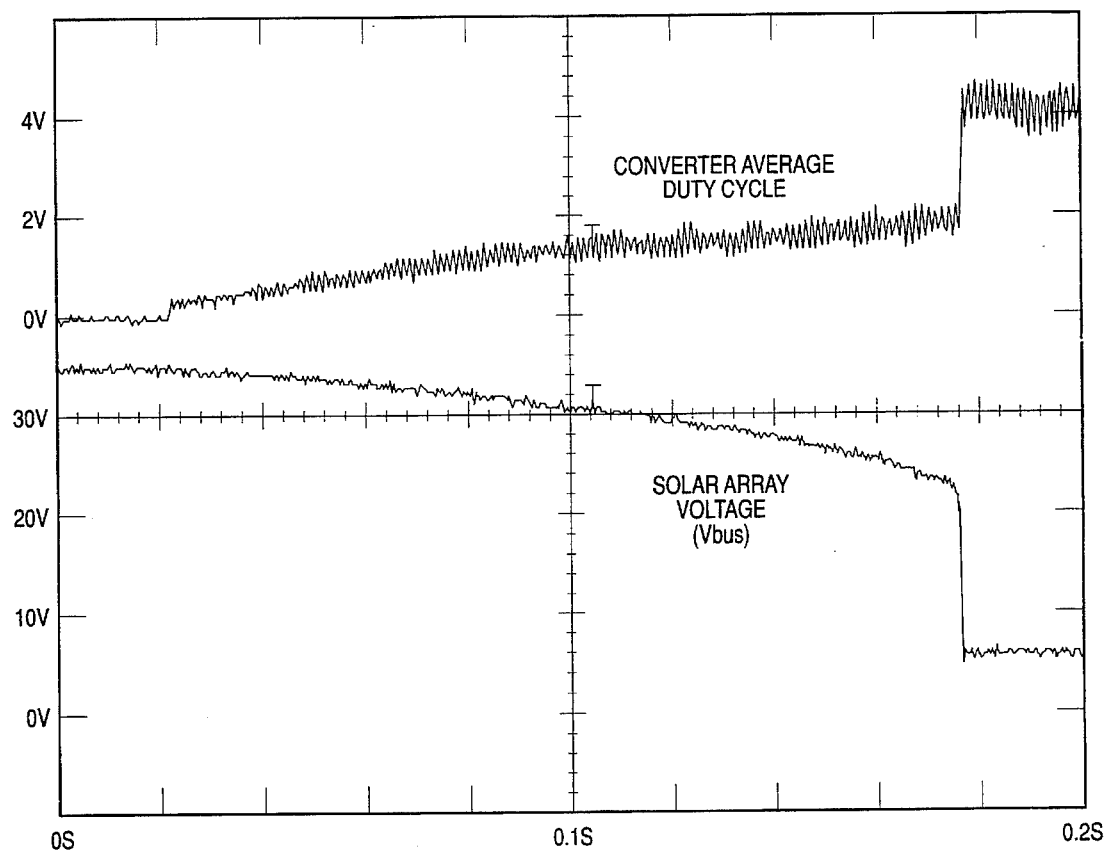
FIG. 3 is a graph illustrating the collapse of array voltage.

FIG. 3 demonstrates this behavior. As the control voltage is ramped up, the array voltage slowly drops as the charger draws more power from the array, until the maximum power point of the array is reached. The array voltage then quickly collapses after that point due to the negative input impedance of the charger. The control voltage comprises a first linear ramp signal when ramped up and a second step down signal.

The present invention changes this procedure. By ramping up the control voltage to the charger and sensing an increase in the rate of array voltage drop, the maximum power point of the system may be detected. The charger is backed off when collapse of array voltage is detected. This decrease in charger power will then push operation back to the stable side of the array, since the bus capacitance provides temporary hold-up; this prevents the array locking up to the battery. By constantly repeating this procedure, the peak power point of the array is maintained.

Figure 4:
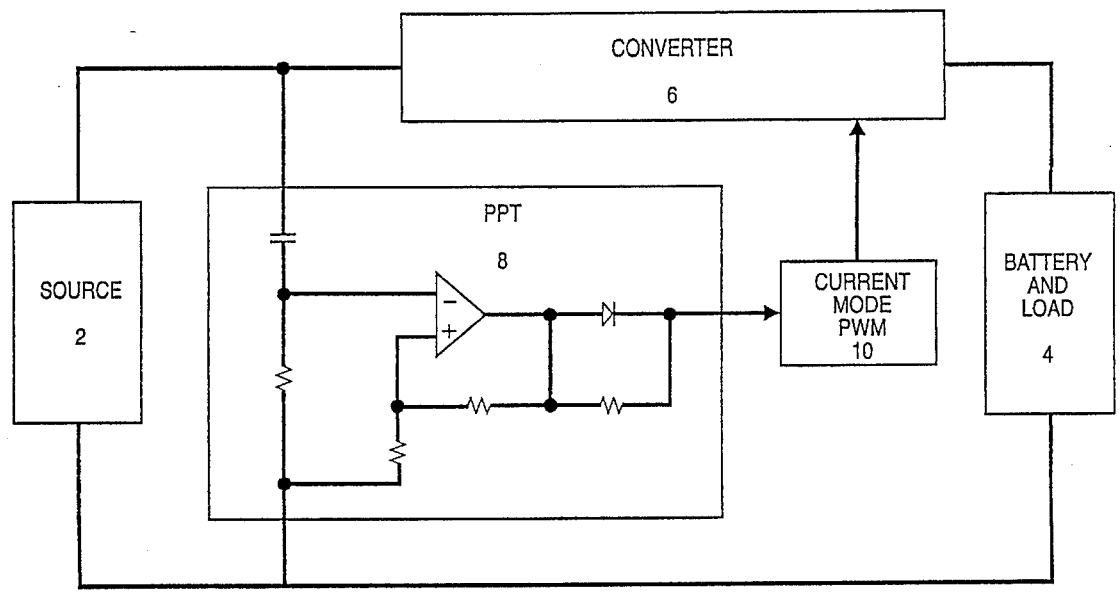
FIG. 4 is a schematic of an embodiment of the present invention incorporating a comparator.

One possible implementation of this concept is shown in FIG. 4. It consists of a source 2, a battery and load 4, a converter 6, a PPT 8, and a current mode pulse width modulator (PWM) 10. A passive highpass network monitors the rate of voltage change in response to increasing power. When the peak power point of the source 2 is reached, voltage collapse begins to occur. The comparator that comprises the PPT 8 detects the resultant high rate in source voltage decay, and decreases the current command of the converter 6 through the current mode PWM 10 (with its error amp configured as an integrator) until the source 2 is again operating on the stable side of the peak power point. This implementation is disclosed by the inventor in "Solar Power System With Simplified Peak Power Tracking", Power Conversion and Intelligent Motion 92.

This type of divergence detection and recovery scheme results in the source operating point fluctuating slightly at the peak power point of the source. Not only is maximum power maintained without source voltage collapse, but the PPT may be implemented with a very simple circuit.

Variations of Invention

Figure 5:
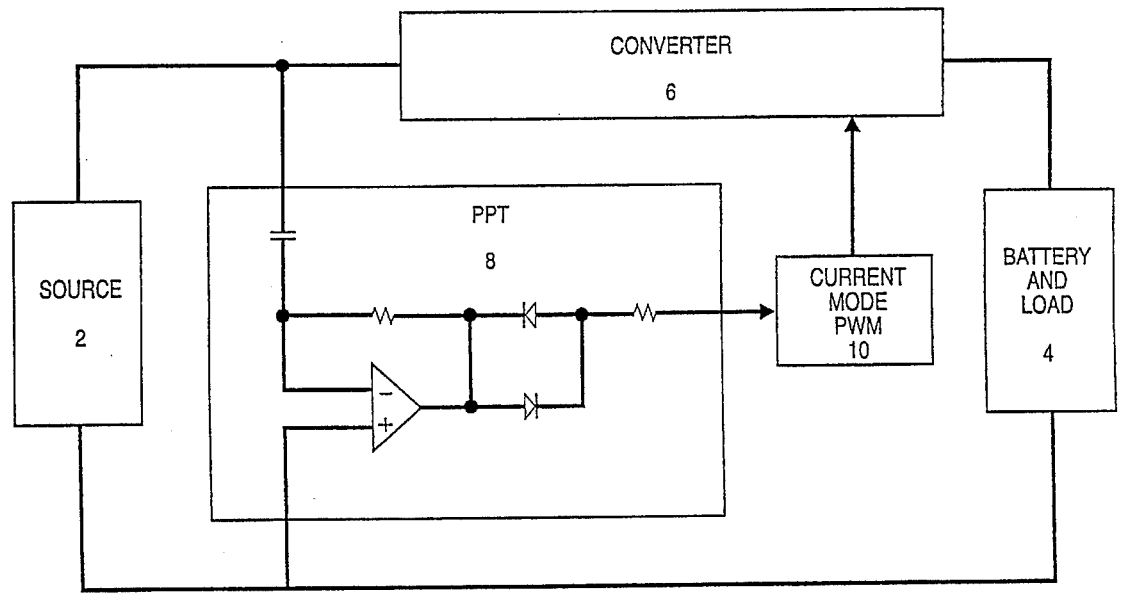
FIG. 5 is a schematic of an embodiment of the present invention incorporating a differentiator.
Figure 6:
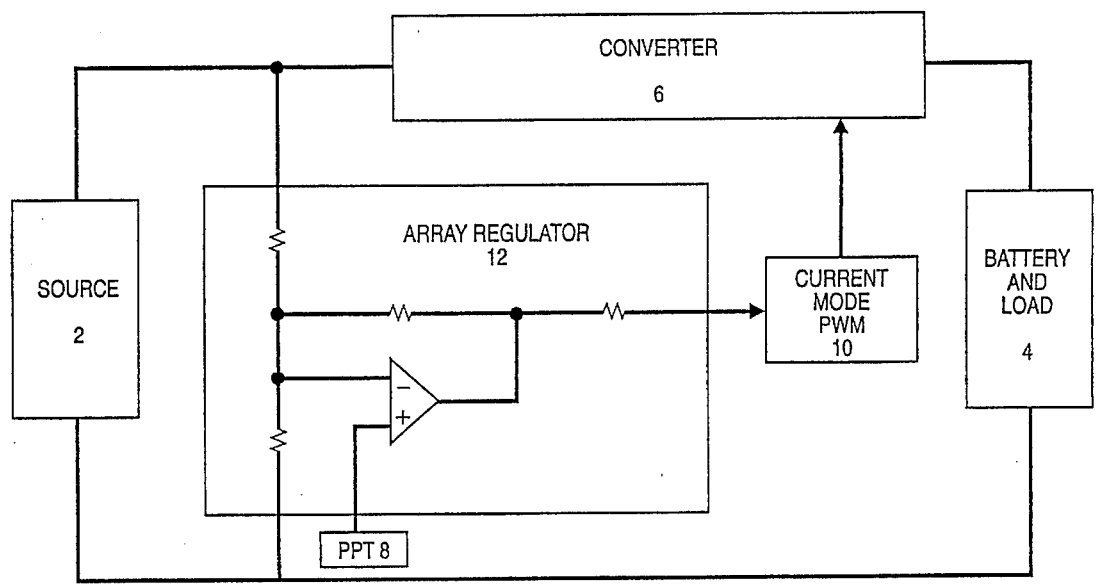
FIG. 6 is a schematic of an embodiment of the present invention incorporating a linear implementation of the negative impedance PPT.

Several variations of the negative impedance PPT invention exist. First, rather than sensing array voltage, other system parameters, such as array current, could be monitored for divergence. Second, rather than the comparator implementation in FIG. 4, a differentiator could be used as in FIG. 5. This version has the advantage that the drive to recover from divergence is proportional to the rate of voltage variation, providing additional resistance to voltage collapse during operation with pulsed loads. Third, the invention may be configured as an add-on feature to other PPT schemes. By using a linear implementation of the invention as in FIG. 6, the array voltage is regulated so that the negative input impedance of the converter is changed to positive and other PPT schemes may be operated at maximum power without voltage collapse. The invention is configured as an array regulator 12 that adjusts the current command to the converter 6 through the current mode PWM 10 so that a constant voltage is maintained at the source 2. Any techniques of PPT 8 may then be employed to select the array voltage corresponding to maximum power, while maintaining stable operation. This last implementation is disclosed by the inventor in "Solar Array Voltage Regulation Study", Intersociety Energy Conversion Engineering Conference 92.

Experimental Results

A laboratory experiment and a computer simulation were performed to validate this PPT technique with the comparator implementation (FIG. 4). In the laboratory experiment, a power source was constructed with a voltage source, series resistance, and parallel capacitance. A power converter was connected to the bus; acting as a negative impedance load. A FET transistor was also connected to the bus to act as a battery charger, where the transistor was controlled by the negative impedance PPT.

Figure 7:
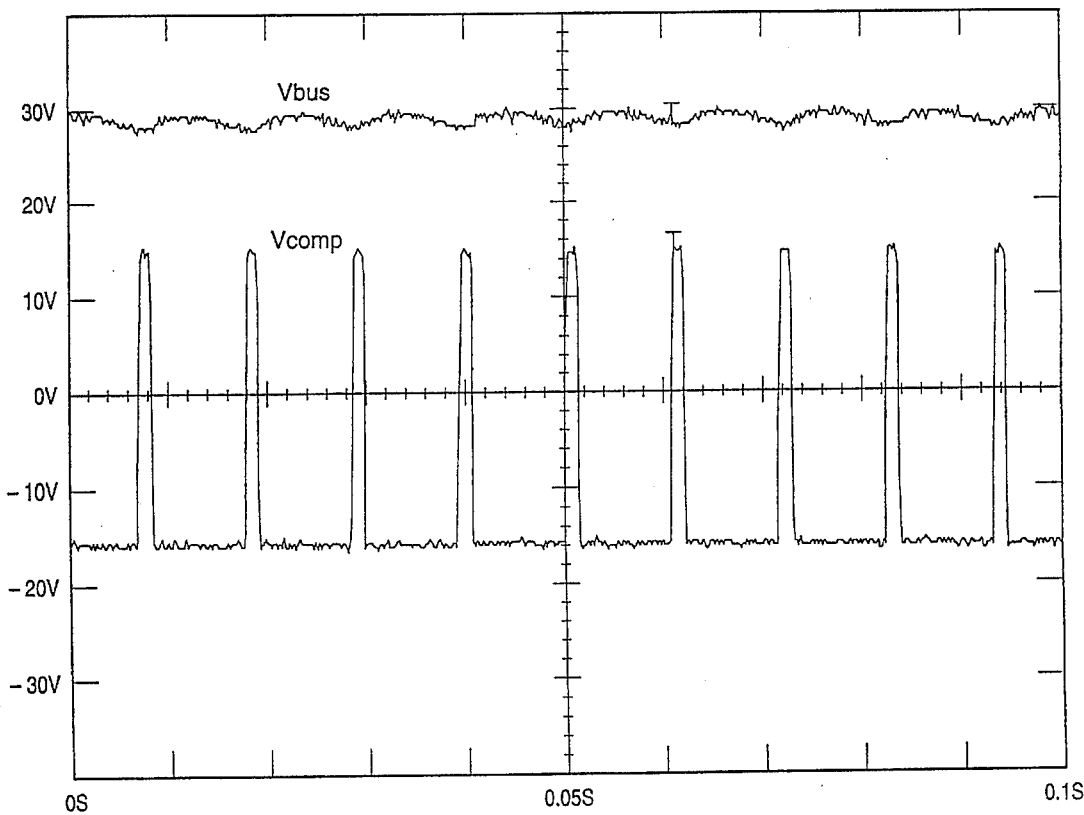
FIG. 7 is a graph illustrating typical waveforms obtained through experiment.

The Table I shows that the source was consistently operated at peak power (Vbus=Vps/2), despite dynamic changes in the source voltage and regulator load. Typical voltage waveforms are also included in FIG. 7.

TABLE I

EXPERIMENTAL TEST RESULTS

| | A | B | C | D | E |
|---|---|---|---|---|---|
| 1 | Vps | Vbus | Perr (%) | Pconv | Pfet |
| 2 | | | | | |
| 3 | 75.00 | 38.40 | 0.06 | 5.50 | 11.90 |
| 4 | 70.00 | 35.60 | 0.03 | 5.50 | 9.79 |
| 5 | 65.00 | 32.70 | 0.00 | 5.50 | 7.68 |
| 6 | 60.10 | 29.50 | 0.03 | 5.50 | 5.75 |
| 7 | 55.00 | 25.70 | 0.43 | 5.50 | 3.83 |
| 8 | 50.00 | 23.00 | 0.64 | 5.50 | 2.18 |
| 9 | 45.00 | 21.30 | 0.28 | 5.50 | 0.70 |
| 10 | 75.00 | 37.40 | 0.00 | 11.00 | 7.07 |
| 11 | 60.00 | 29.50 | 0.03 | 11.00 | 0.50 |

The computer simulation was similar. Once again, the peak power point of the source was found and maintained.

Both experiments demonstrate the benefits of the present invention due to its simplicity and effectiveness. The low parts count increases reliability while reducing power consumption. The simple design is also easy to implement and manufacture. The present invention is effective because the peak power point is closely tracked.

Two possible applications of the negative impedance PPT include use in a standard spacepower system architecture and in an electric propulsion power system. For example, the present invention would help to insure that solar power is fully utilized, thereby reducing the size and weight of the solar array. A load converter with switched outputs for payload support should also be incorporated.

Although the invention has been described in terms of a preferred embodiment, it will be obvious to those skilled in the art that alterations and modifications may be made without departing from the invention. Accordingly, it is intended that all such alterations and modifications be included within the spirit and scope of the invention as defined by the appended claims.

I claim:

1. A peak power tracker apparatus for maintaining peak power delivered from a source having an input impedance and source voltage and providing electrical power to a load, said apparatus comprising, converter means connected between said source and said load for providing said source with a negative load impedance which is controllable, said source voltage becomes unstable when said input impedance equals said load impedance when said source delivers peak power through said converter to said load at a peak power point, peak power tracking means connected to said source for sensing said source voltage, and for providing a first signal when said source is stable before becoming unstable, and for providing a second signal when said source voltage begins to become unstable when said source delivers peak power to said load at said peak power point, and control means connected to said peak power tracking means for receiving said first and second signals and connected to said converter for controlling said converter to vary said load impedance, said control means for receiving said first signal when controlling said converter means to vary said input impedance to drive said source voltage from a stable point towards said peak power point and for receiving said second signal said when controlling said converter means to vary said input impedance to drive said source voltage away from said peak power point to said stable point.

2. The apparatus of claim 1 wherein, wherein the power source is a solar array.

3. The apparatus of claim 1 wherein said load comprises a battery.

4. The apparatus of claim 1 wherein said source voltage begins to rapidly collapse when beginning to become unstable at said peak power point, and said peak power tracking means senses said source voltage capacitive differentiation for determining when said voltage source has reached said peak power point.

5. The apparatus of claim 1 wherein said first signal is a linear ramp up signal, and said second signal is a step down signal.

6. The apparatus of claim 1 wherein control means provides a current mode pulse width modulated command signal to said converter means, and said converter means is a current mode converter having a regulated current output to said load, said input impedance is controlled by said current mode pulse width modulated command signal.

7. The apparatus of claim 1, wherein said source voltage stable point through discontinuous feedback loop control of said source voltage through a loop comprising said converter means, said peak power tracking means and said control means.

8. A method for maintaining peak power delivered from a source to a load, said source has a source voltage, an input impedance and a load impedance which is negative, said source voltage begins to become unstable at a peak power point of maximum power transfer from said source to said load when said input impedance equals said load impedance, said method comprising the steps of, transferring power from said source to said load, sensing when said source voltage is between said peak power point and a stable point, generating a first control signal indicating that said source voltage is stable between said peak power point and said stable point, controlling said input impedance during the present of said first control signal to drive said source voltage towards said peak power point, sensing when said source voltage is at said peak power point, generating a second unstable control signal indicating when said source voltage is at said peak power point, and controlling said load impedance during the present of said second control signal to drive said source voltage from said peak power point to said stable point.

9. The method of claim 8 wherein, said second control signal is a step down signal, said first control signal is a linear ramp up signal, said source voltage begins to rapidly collapse when at said peak power point, and said sensing step is a differentiating step for differentiating said source voltage to sense when said source voltage begins to rapidly collapse.

10. The method of claim 8 wherein, further comprising the steps of, translating said first and second control signals into converter command signals for controlling said load impedance.

11. The method of claim 10 wherein, said second control signal is a step down signal, said first control signal is a linear ramp up signal, said source voltage begins to rapidly collapse at said peak power point, said sensing step is a differentiating step for differentiating said source voltage to sense when said source voltage begins to rapidly collapse, said converter command signals are current mode pulse width modulated converter control signals for controlling said load impedance, and said translating step translates said step down signal and said linear ramp up signal into said current mode pulse width modulated converter control signals.

\* \* \* \* \*